United States Patent
Lee et al.

(10) Patent No.: US 8,119,275 B2
(45) Date of Patent: Feb. 21, 2012

(54) REMOVABLE AND SHORT-CIRCUIT-AVOIDABLE LITHIUM BATTERY MODULE

(75) Inventors: Chien-Fang Lee, Kaohsiung County (TW); Po-Kun Chen, Kaohsiung (TW)

(73) Assignee: STL Technology Co., Ltd., Kaohsiung (TW)

( * ) Notice: Subject to any disclaimer, the term of this patent is extended or adjusted under 35 U.S.C. 154(b) by 682 days.

(21) Appl. No.: 12/338,087

(22) Filed: Dec. 18, 2008

(65) Prior Publication Data
US 2010/0149706 A1    Jun. 17, 2010

(30) Foreign Application Priority Data
Dec. 11, 2008 (TW) .............................. 97148314 A

(51) Int. Cl.
  *H01M 2/24* (2006.01)
  *H01M 6/42* (2006.01)
  *H01M 12/00* (2006.01)
  *H01M 2/10* (2006.01)

(52) U.S. Cl. ................ 429/158; 429/9; 429/96; 429/97; 429/99; 429/100; 429/149; 429/150; 429/156; 429/160

(58) Field of Classification Search .............. 429/1, 9, 429/96, 97, 99, 100, 149, 150, 156, 158, 429/160
See application file for complete search history.

(56) References Cited

U.S. PATENT DOCUMENTS
6,351,097 B1 *  2/2002  Oh ................................ 320/107
* cited by examiner

*Primary Examiner* — Gregg Cantelmo
*Assistant Examiner* — Eugenia Wang
(74) *Attorney, Agent, or Firm* — Rosenberg, Klein & Lee

(57) ABSTRACT

A removable and short-circuit-avoidable lithium battery module mainly makes use of a protective device mounted between a control circuit and any two cells. Wherein, the protective device includes a base plate and a conductive surface connecting with the cell, an output tab connecting with the control circuit, and a protective unit mounted on the conductive surface and the output tab. Whereby, the conductive surface and the output tab have larger areas to respectively link the cell and the control circuit. While connecting with electricity, the cell and the control circuit would be more accurately connected. Moreover, the protective unit would become disconnected while the cell and the control circuit are fell and collided, so as to prevent the cell and the control circuit from the inaccurate connection and destruction. The present invention also facilitates to swiftly replace the protective device while it is damaged and to contribute a convenient utility.

4 Claims, 4 Drawing Sheets

REMOVABLE AND SHORT-CIRCUIT-AVOIDABLE LITHIUM BATTERY MODULE

BACKGROUND OF THE INVENTION

1. Field of the Invention

The present invention relates to a lithium battery module, more particularly to a removable and short-circuit-avoidable lithium battery module.

2. Description of the Related Art

Referring to FIG. 1, a conventional lithium battery module consists of a plurality of cells 11 and a control circuit 12 connected with the cells 11. Wherein, the control circuit 12 has a control unit 121 and a plurality of resistances 123 that each is crossly mounted on the control circuit 12 and attached to the control unit 121. Herein, each resistance 123 further connects with the cell 11, and the control circuit 12 is integrally mounted on a PCB (printed circuit board), and hence the control circuit 121 and the resistance 123 are fixedly disposed on the same PCB, so that each cell 11 can be connected with the control circuit 12 via a conductive terminal 122. As a result, the control circuit 12 could control and protect the lithium battery module 1; namely, the control circuit 12 has protective devices for detecting the overcharging or over-discharging to prevent the cell 11 from exceeding or below a certain voltage threshold, and the resistance 123 can further avert the cell 11 from an exterior short circuit to concurrently balance the voltage, current, and volume of electricity within the cell 11 so as to secure a regular operation of the lithium battery module 1.

However, the lithium battery module 1 has the following shortcomings:

1. In manufacturing, each cell 11 directly applies the conductive terminal 122 made of metal materials to attach with the resistance 123. However, in view of the larger area of the conductive terminal 122, the cell 11 may have its terminal 122 tend to be imprecisely connected and subjected to touch other contacting points within the control circuit 12, where no resistances 123 are disposed. Therefore, the slip-up connection results in a short circuit or a burnout, or more seriously an explosion of the control circuit 12 or the cell 11, which raises an attention thereof.
2. During transportation or application, if the lithium battery module 1 is incautiously dropped, the departure of the conductive terminal 122 of the cell 11 from the control circuit 12 is resulted, hence incurring an incorrect link of the conductive terminal 122 to other contacting points on the control unit 121. As a result, the control circuit 12 or the cell 11 is short-circuit and consumed, or more seriously, the cell 11 would explode.
3. Furthermore, the allocation of the resistance 123 fixed on the control circuit 12 merely serves to execute the protection of the overcharging, over-discharging, and short circuit of the regularly operated cells 11. If the conductive terminal 122 incorrectly contacts other portion on the control circuit 12 as above depicted, the control circuit 12 or the cell 11 is subjected to be destroyed or becomes short. Obviously, the integral construction of the control circuit 12 on the PCB results in an inconvenience of the follow-up repair and operation.

SUMMARY OF THE INVENTION

The object of the present invention is to provide a removable and short-circuit-avoidable lithium battery module that can preferably avoid a mistaken join during connection, thereby preventing cells and a control circuit from damage, providing a swift replacement of a damaged protective device, and promoting a convenient application.

The present invention essentially comprises a removable and short-circuit-avoidable lithium battery module that employs a protective device that is removable mounted between a control circuit and a plurality of cells to serially connect two cells. Wherein, the protective device includes a base plate for the cells to connect therewith, an output tab connected with the control circuit, a conductive surface mounted on the base plate, and a protective unit crossly disposed on the conductive surface and the output tab. Particularly, an anode and a cathode of the cell can connect with the conductive surface. Further, the output tab includes a tab body, a linking point and an output point defined on the opposite ends of the tab body. Herein, the output point connects with the control circuit, and the linking point connects with the protective unit. Thus, the cells and the control circuit are permitted to engage with respective larger areas on the base plate and the output, which thence preferably decreases an error connection thereof. Superiorly, the protective unit of the protective device would be preliminarily disconnected while the error connection of the cells to the control circuit is resulted from an incautious falling of the lithium battery module. As a result, the cell and the control circuit are favorably prevented from damage, and the damaged protective device can be rapidly replaced, thereby conducing to a convenience of application.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
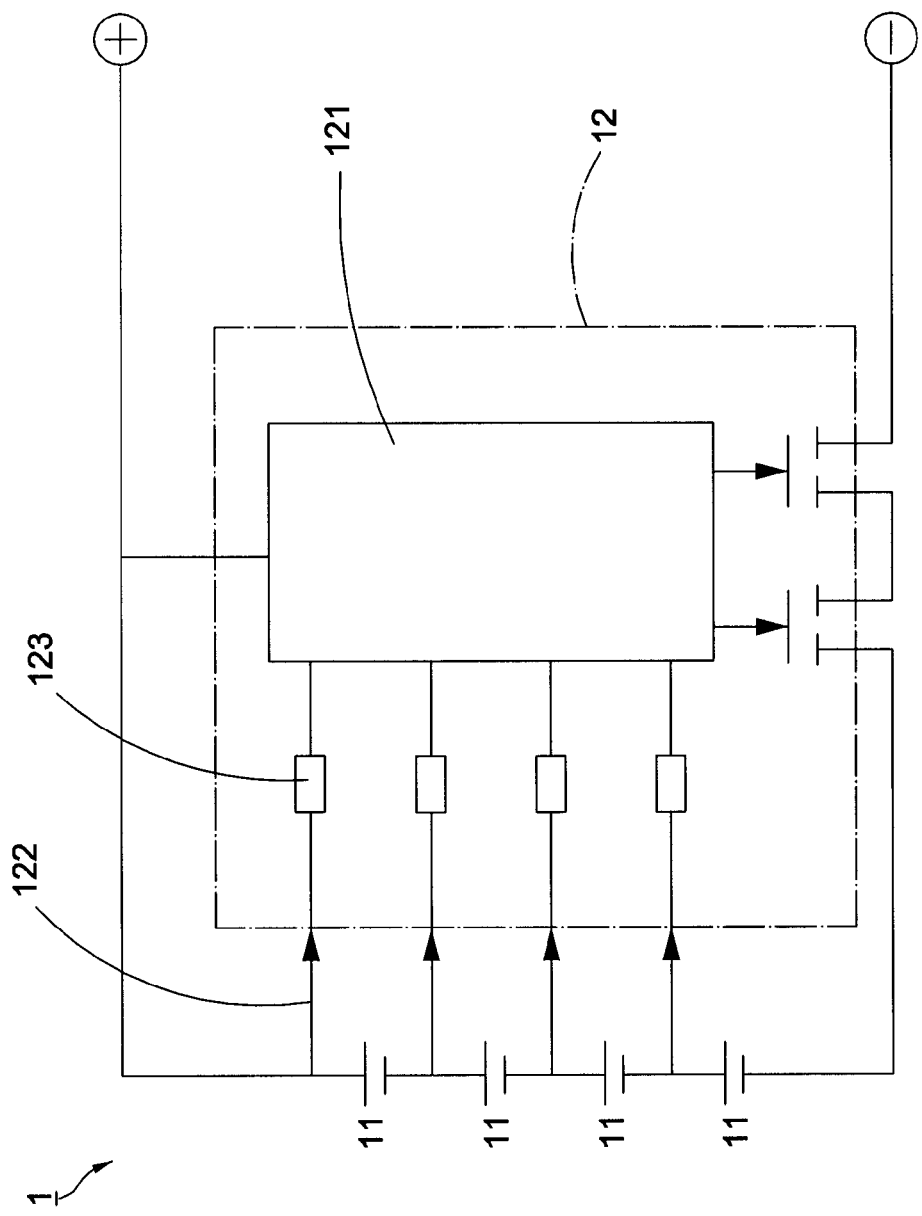
FIG. 1 is a schematic view showing a frame of a conventional invention.

Before describing in greater detail, it should note that the like elements are denoted by the similar reference numerals throughout the disclosure.

Figure 2:
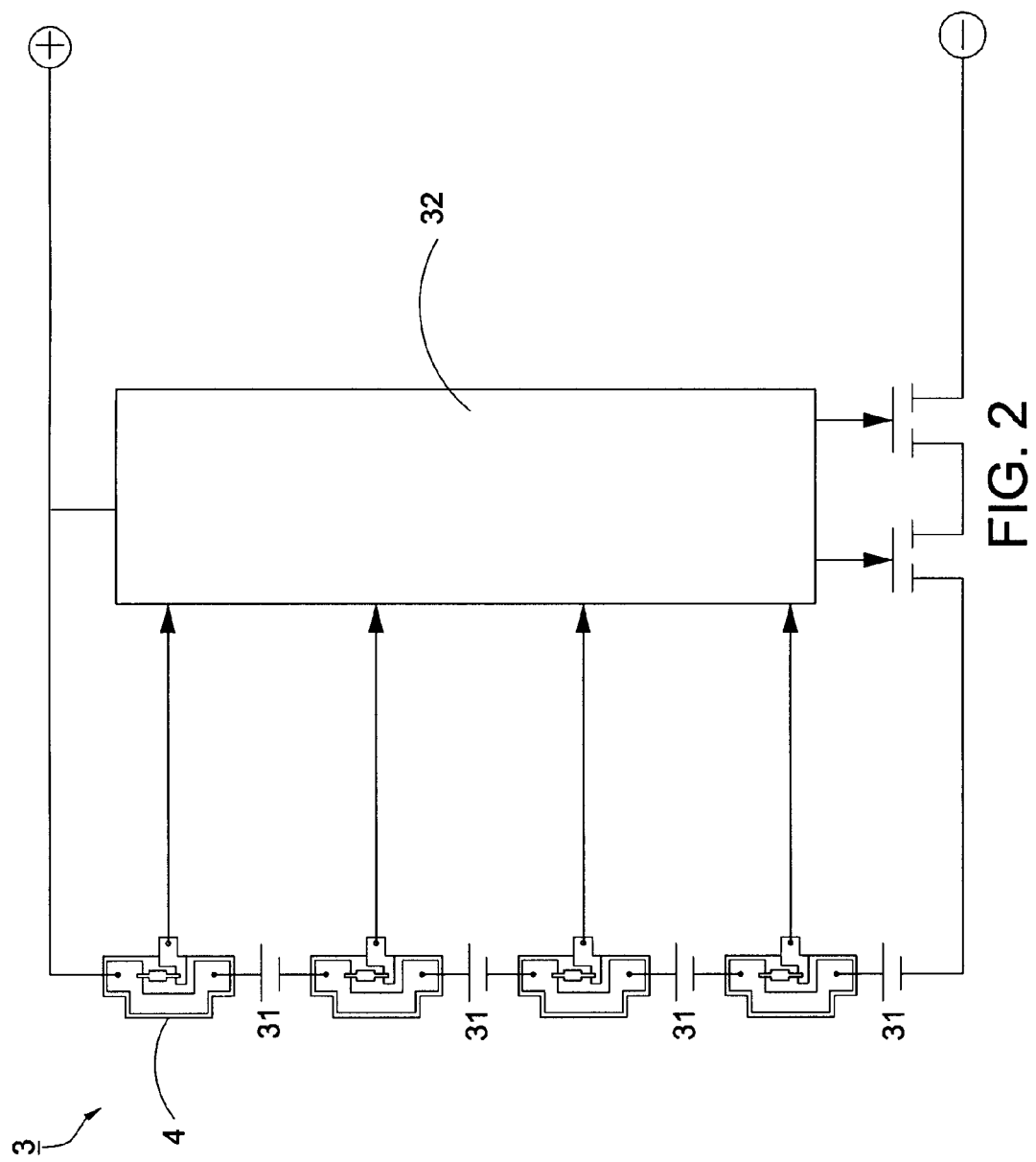
FIG. 2 is a schematic view showing a frame of a first preferred embodiment of the present invention.
Figure 3:
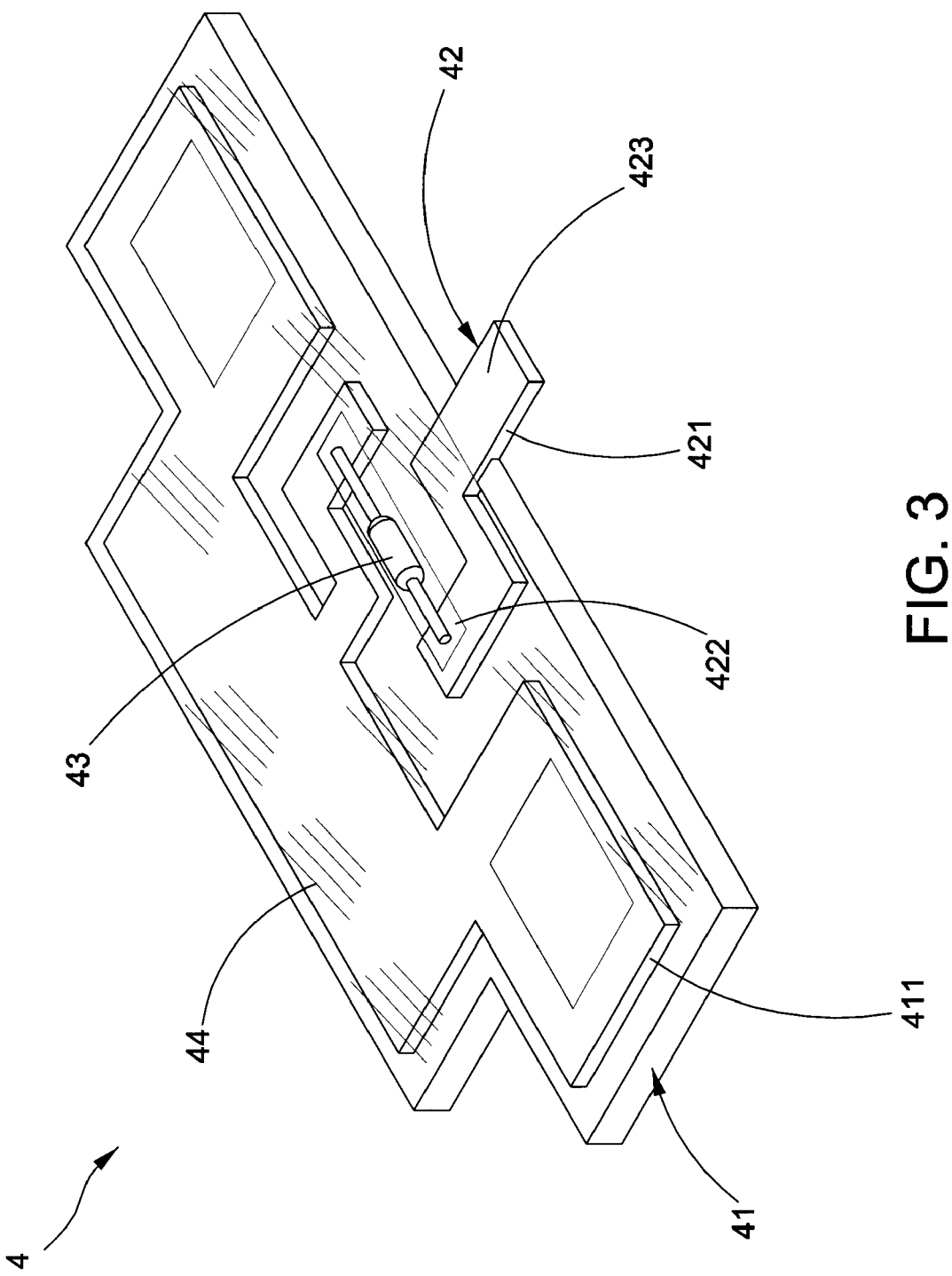
FIG. 3 is a perspective view showing a protective device of the first preferred embodiment.

Referring to FIGS. 2 and 3 showing a first preferred embodiment of the present invention, a lithium battery module 3 comprises a plurality of cells 31, a control circuit 32, and a protective device 4 mounted between the cells 31 and the control circuit 32. In this embodiment, the cells 31 consist of four, and each of the cells 31 has two electrodes, an anode and a cathode. Wherein, the protective device 4 includes a base plate 41 connected with one of the electrode of the cell 31, an output tab 42 connected with the control circuit 32, and a protective unit 43 crossly disposed on the base plate 41 and the output tab 42. Further, a conductive surface 411 is defined on the base plate 41 for the electrodes of the cell 31 to link. Concurrently, the base plate 41 is wrapped in an insulated membrane 44 except a certain and sufficient area for both edges of the conductive surface 411 and the protective unit 43, so as to prevent the cells 31 from a short circuit by the contact of the adjacent conductive terminals thereof.

Further, the output tab 42 has a tab body 421, a linking point 422 and an output point 423 defined on the opposite ends of the tab body 421. Particularly, the output point 423 connects with the control circuit 32, and the linking point 422 connects with the protective unit 43. As it should be, the protective unit 43 can be a diode or a resistance. Herein this embodiment, the protective unit 43 adopted by a resistance renders a norm of currents intercommunicating between the cells 31 and the control circuit 32 so as to prevent the cells 31 and the control circuit 32 from an exceeding current.

Further referring to FIGS. 2 and 3, the cells 31 are preliminarily and serially connected, and the anode and cathode of the proximate cells 31 is connected with both edges of the conductive surface 411, so that a larger area is provided by the conductive surface 411 for the conductive terminals of the cells 31 to be soldered thereon. Moreover, another larger area is also provided by the output point 423 of the output tab 42 for the control circuit 32 to be soldered thereon. As a result, an error connection between the cells 31 and the control circuit 32 is substantially prevented in view of the respective connections of the conductive surface 411 and the output tab 42. In addition, the protective unit 43 bridged between the linking point 422 and the conductive surface 411 configures a high impedance circuit between the output tab 42 and the control circuit 32. Thus, even if the neighboring solders of the conductive terminals on the control circuit 32 involuntarily touch with each other, there would be little electric currents provided generated from the cells 31 traveling therethrough under the resistance of the protective unit 43. Whereas the electric currents exceed a threshold, the protective unit 43 would be immediately consumed by itself, so that the output tab 42 would be disconnected with the base plate 41. Therefore, the arrangement of the protective unit 43 efficiently prevents the cells 31 or the control circuit 32 from a short circuit or damage, much less an explosion. Furthermore, the protective device 4 can be freely replaced if any brokenness exists, and the lithium battery module 3 is resumed without repairing the control circuit 32 and the cells 31, which favorably promotes a convenience of usage.

Figure 4:
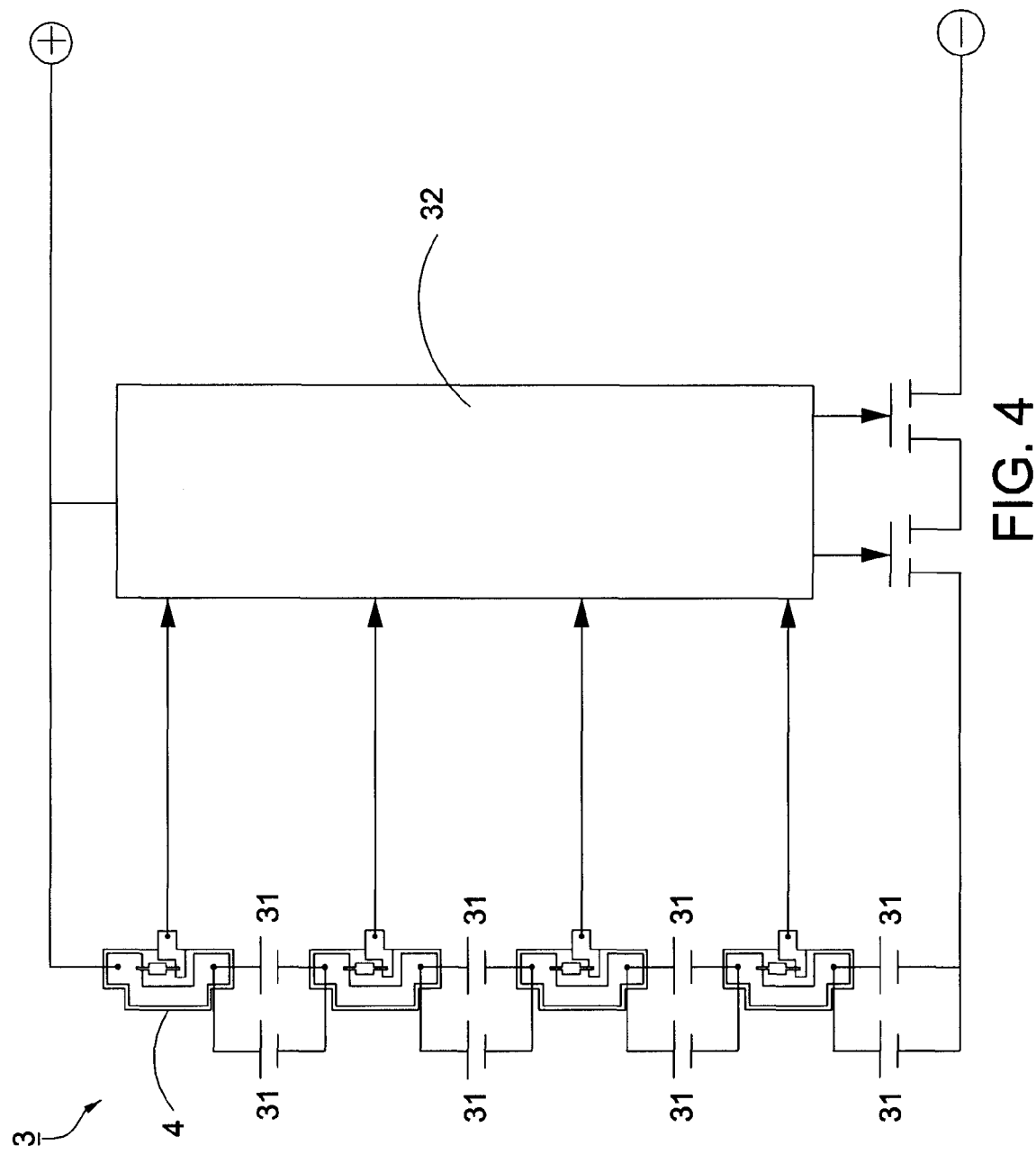
FIG. 4 is a schematic view showing a frame of a second preferred embodiment of the present invention.

Referring to FIG. 4 showing a second preferred embodiment of the present invention, the lithium battery 3 essentially comprises a plurality of cells 31, a control circuit 32, and at least two protective devices 4 disposed between the cells 31 and the control circuit 32. Wherein, the same formation, application, and efficiency of the lithium battery module 3 as those of the first preferred embodiment are herein omitted. Wherein, it is adopted in this embodiment that two of the cells 31 are serially connected to form a set, and at least two sets of the cells 31 are in a parallel concatenation as shown in the figure. Herein, the anodes and the cathodes of the cell set 31 are connected with discrete base plates 41 of the protective devices 4. In addition, the relationship between cells 31 and the control circuit 32 engaged by means of the output tabs 42 of the protective devices 4 is still the same as that of the first preferred embodiment to create the effect of high impedance circuit therebetween.

Thus, the present invention has the following improvements:

1. Larger areas are provided by the conductive surface of the base plate and the output tab for their respective cells to connect with the control circuit. While during manufacturing, the individual soldering can be precisely executed to avoid an error soldering resulted from contacting other areas within the control circuit, so that the occurrence of a short circuit and the damage to the control circuit and the cell would be avoided.
2. If one contacting point of one cell departs from the control circuit by mindless dropping or vibration during transportation or application to incur an inaccurate connection of the cell with the control circuit, the protective device would be immediately consumed to cause the disconnection of the output tab and the base plate, thereby protecting the cells or the control circuit from short circuit as well as protecting the cell from explosion.
3. The protective device and the control circuit can prevent the lithium battery module from overcharging, over-discharging, and short circuit while connection. In addition, the protective unit of the protective device would be previously disconnected to preclude the occurrence of damage to the cell and the control circuit while the cell does not connect with its corresponding contacting point on the control circuit. In this manner, the damaged protective device can be swiftly replaced to increase the convenience of application.

To sum up, the removable and short-circuit-avoidable lithium battery module of the present invention takes advantage of a removable protective device having larger areas to separately engage with cells and a control circuit. Therefore, the incident of the damaged control circuit or cells by the error connection thereof can be avoided, and the damaged protective device can be also swiftly substituted for a new one, which thus conduces to an augmented convenience of usage.

While we have shown and described the embodiment in accordance with the present invention, it should be clear to those skilled in the art that further embodiments may be made without departing from the scope of the present invention.

We claim:

1. A removable and short-circuit-avoidable lithium battery module comprising:
   a plurality of cells; each of said cells having an anode and a cathode;
   a control circuit; and
   at least one removable protective device serially connecting any two of said cells; said protective device including a base plate that connects with an anode of a first cell and a cathode of a second cell in series therewith, an output tab connecting with said control circuit, a conductive surface disposed on said base plate, and a protective unit crossly disposed on said conductive surface and said output tab; wherein, said conductive surface on said base plate of each of the at least one removable protective device transmitting currents between an anode of one cell and a cathode of another cell in series therewith; said output tab having a tab body, a linking point disposed at one side thereof, and an output point disposed on an opposite side thereof; said output point reciprocally connecting to said control circuit, and said linking point jointly linking with said protective unit.

2. The removable and short-circuit-avoidable lithium battery module as claimed in claim 1, wherein, said base plate is wrapped in an insulated membrane except a first contacting portion where said conductive surface engages with said cell and a second contacting portion where said protective unit touches said conductive surface and said linking point.

3. The removable and short-circuit-avoidable lithium battery module as claimed in claim 1, wherein, said protective unit is a diode.

4. The removable and short-circuit-avoidable lithium battery module as claimed in claim 1, wherein, said protective unit is a resistance.

* * * * *